United States Patent
Li et al.

(10) Patent No.: US 12,316,566 B2
(45) Date of Patent: May 27, 2025

(54) VEHICLE POSITIONING METHOD AND DEVICE, POSITIONED VEHICLE, VEHICLE TO BE POSITIONED, AND STORAGE MEDIUM

(71) Applicant: DATANG MOBILE COMMUNICATIONS EQUIPMENT CO., LTD., Beijing (CN)

(72) Inventors: Hui Li, Beijing (CN); Rui Zhao, Beijing (CN); Ren Da, Beijing (CN); Bin Ren, Beijing (CN); Deshan Miao, Beijing (CN); Xiaotao Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 435 days.

(21) Appl. No.: 17/790,498

(22) PCT Filed: Aug. 26, 2020

(86) PCT No.: PCT/CN2020/111410
§ 371 (c)(1),
(2) Date: Jun. 30, 2022

(87) PCT Pub. No.: WO2021/135305
PCT Pub. Date: Jul. 8, 2021

(65) Prior Publication Data
US 2023/0061410 A1    Mar. 2, 2023

(30) Foreign Application Priority Data

Dec. 31, 2019  (CN) .......................... 201911422002.9

(51) Int. Cl.
*H04L 1/00* (2006.01)
*H04L 5/00* (2006.01)
*H04W 64/00* (2009.01)

(52) U.S. Cl.
CPC .......... *H04L 5/0051* (2013.01); *H04L 5/0098* (2013.01); *H04W 64/00* (2013.01)

(58) Field of Classification Search
CPC ... H04L 5/0051; H04L 5/0098; H04L 5/0005; H04L 5/0085; H04L 5/0033;
(Continued)

(56) References Cited

U.S. PATENT DOCUMENTS

2010/0234043 A1  9/2010  Wigren et al.
2019/0302220 A1  10/2019 Kumar et al.
(Continued)

FOREIGN PATENT DOCUMENTS

CN   106143538 A   11/2016
CN   106688294 A    5/2017
(Continued)

OTHER PUBLICATIONS

European Patent Office, Extended European Search Report Issued in Application No. 20909814.4, Dec. 11, 2023, Germany, 14 pages.
(Continued)

*Primary Examiner* — Tanmay K Shah
(74) *Attorney, Agent, or Firm* — Kilpatrick Townsend & Stockton LLP (57) ABSTRACT

The present application discloses a vehicle positioning method and device, a positioning vehicle, a vehicle to be positioned, and a storage medium. The method includes: determining configuration information of a positioning reference signal of a positioning vehicle; and transmitting, according to the configuration information, the positioning reference signal to a vehicle to be positioned, and the vehicle
(Continued)

to be positioned determines a positioning measurement quantity based on the positioning reference signal. The configuration information of the positioning reference signal is determined by the positioning vehicle and the transmission of the positioning reference signal is started to the vehicle to be positioned according to the configuration information, and the vehicle to be positioned can determine the positioning measurement quantity according to the positioning reference signal, and improving the positioning performance and avoiding configuration conflicts between positioning reference signals.

16 Claims, 3 Drawing Sheets

(58) Field of Classification Search
CPC ... H04L 5/0048; H04L 5/0053; H04L 5/0069; H04L 5/0094; H04L 5/0096; H04L 5/0091; H04L 5/0023; H04W 64/00; H04W 4/46; H04W 4/02; H04W 4/40; G01S 1/042; G01S 5/0215; G01S 5/0284
USPC .................................................. 455/456.1
See application file for complete search history.

(56) References Cited

U.S. PATENT DOCUMENTS

| | | | |
|---|---|---|---|
| 2021/0250892 A1* | 8/2021 | Kim | H04L 5/0048 |
| 2022/0039080 A1* | 2/2022 | Khoryaev | H04W 4/40 |

FOREIGN PATENT DOCUMENTS

| | | |
|---|---|---|
| CN | 108260219 A | 7/2018 |
| CN | 109391667 A | 2/2019 |
| CN | 110062457 A | 7/2019 |
| CN | 110351682 A | 10/2019 |
| WO | 2014112915 A1 | 7/2014 |
| WO | 2019141090 A1 | 7/2019 |
| WO | 2019223659 A1 | 11/2019 |

OTHER PUBLICATIONS

Hossain Md Anowar et al: "High Accuracy GPS-Free Vehicular Positioning Based on V2V Communications and RSU-Assisted DOA Estimation", 2017 9th IEEE-GCC Conference and Exhibition (GCCCE), IEEE, May 8, 2017, total 5 pages.
Qualcomm Incorporated, "On Demand Transmission of PRS for NR", 3GPP TSG-RAN WG2 Meeting #104, Spokane, USA, Nov. 12-16, 2018, total 27 pages, R2-1817902.

* cited by examiner

Receiving a positioning reference signal transmitted by a positioning vehicle, and determining a positioning measurement quantity according to the positioning reference signal; wherein the positioning reference signal is obtained by the positioning vehicle according to the configuration information of the positioning reference signal ⎯ S401

VEHICLE POSITIONING METHOD AND DEVICE, POSITIONED VEHICLE, VEHICLE TO BE POSITIONED, AND STORAGE MEDIUM

CROSS-REFERENCE TO RELATED APPLICATIONS

The present application is a US National Stage of International Application No. PCT/CN2020/111410, filed on Aug. 26, 2020, which claims priority to Chinese application No. 201911422002.9 filed on Dec. 31, 2019, entitled "Vehicle Positioning Method and Device, Positioned Vehicle, Vehicle to Be Located and Storage Medium", which is hereby incorporated by reference in its entirety.

FIELD

The present application relates to the field of communication, and in particular, to a vehicle positioning method and device, a positioning vehicle, a vehicle to be positioned, and a storage medium.

BACKGROUND

In 5th Generation (fifth-generation (5G) mobile communication technology) technology, in order to support positioning requirements, 5G New Radio (NR) Uu interface (a connection interface between a user equipment (UE)) and a Wideband Code Division Multiple Access (WCDMA) system) defines a downlink positioning reference signal (PRS). The corresponding definitions are as follows:

1. Downlink (DL) PRS Resource Set:

A DL PRS resource set is a set containing DL PRS resources, and each of the DL PRS resources has a DL PRS resource identifier (ID), and all DL PRS resources in the DL PRS resource set are associated with the same base station (i.e., transmission reception point (TRP));

One DL PRS resource ID in one DL PRS resource set is associated with a single beam transmitted from a single TRP, and in such case, the TRP can transmit one or more beams;

2. DL PRS Resources:

The Comb-N resource element pattern of each DL PRS resource is used to map a DL PRS sequence to resource elements in frequency domain, and the Comb-N pattern can offset in frequency domain across symbols of the DL PRS resource;

the DL PRS resource is described by at least the following parameters: DL PRS resource ID, sequence ID, Comb Size-N, resource element (RE) frequency offset, initial slot and symbol of the DL PRS resource, and the number of symbols of each DL PRS resource (duration of the DL PRS resources) and quasi co-location (QCL) information with other DL reference signals;

the number of symbols of the DL PRS resource can be flexibly configured from the set {2, 4, 6};

a Comb-N value of the DL PRS resource can be flexibly configured from the set {2, 4, 6}; and the position of the initial physical resource block (PRB) of the DL PRS resource is defined with respect to Point A of each frequency layer.

However, in the Internet of Vehicles, there is no configuration of a positioning reference signal in the related art, and a method for positioning based on the positioning reference signal is also desired.

SUMMARY

Due to the above-mentioned problems in the existing methods, an embodiment of the present application provides a vehicle positioning method and device, a positioning vehicle, a vehicle to be positioned, and a storage medium.

In some embodiments of the present application, a vehicle positioning method is provided, including:
determining configuration information of a positioning reference signal of a positioning vehicle; and
transmitting, according to the configuration information, the positioning reference signal to a vehicle to be positioned, and the vehicle to be positioned determines a positioning measurement quantity according to the positioning reference signal.

In one embodiment of the present application, a vehicle positioning method is further provided, including:
receiving a positioning reference signal transmitted by a positioning vehicle, and determining a positioning measurement quantity according to the positioning reference signal; and the positioning reference signal is obtained by the positioning vehicle according to the configuration information of the positioning reference signal.

In one embodiment of the present application, a vehicle positioning device is further provided, including:
a configuration information determining device, configured to determine the configuration information of a positioning reference signal of a positioning vehicle;
a signal transmitting device, configured to transmit, according to the configuration information, the positioning reference signal to a vehicle to be positioned, and determining, by the vehicle to be positioned, a positioning measurement quantity according to the positioning reference signal.

In one embodiment of the application, a vehicle positioning device is further provided, including:
a signal receiving device, configured to receive a positioning reference signal transmitted by a positioning vehicle, and determine a positioning measurement quantity according to the positioning reference signal;
the positioning reference signal is obtained by the positioning vehicle according to the configuration information of the positioning reference signal.

In one embodiment of the present application, a positioning vehicle is further provided, including:
at least one processor; and
at least one memory communicatively connected to the processor, and:
the memory stores program instructions executable by the processor, the processor invokes the program instructions to perform the following method:
determining configuration information of a positioning reference signal of a positioning vehicle; and
transmitting, according to the configuration information, the positioning reference signal to a vehicle to be positioned, and determining, by the vehicle to be positioned, a positioning measurement quantity according to the positioning reference signal.

In one embodiment of the present application, a vehicle to be positioned is further provided, including:
at least one processor; and
at least one memory communicatively connected to the processor, and:
the memory stores program instructions executable by the processor, the processor invokes the program instructions to perform the following step of:
receiving a positioning reference signal transmitted by a positioning vehicle, and determining a positioning measurement quantity according to the positioning reference signal;
the positioning reference signal is obtained by the positioning vehicle according to the configuration information of the positioning reference signal.

In one embodiment of the present application, a non-transitory computer readable storage medium having stored thereon computer programs is provided, the computer programs cause the computer to perform the following steps of:

determining configuration information of a positioning reference signal of a positioning vehicle; and transmitting, according to the configuration information, the positioning reference signal to a vehicle to be positioned, and determining, by the vehicle to be positioned, a positioning measurement quantity according to the positioning reference signal.

In one embodiment of the present application, a non-transitory computer readable storage medium having stored thereon computer programs is provided, the computer programs cause the computer to perform the following step of:

receiving a positioning reference signal transmitted by a positioning vehicle, and determining a positioning measurement quantity according to the positioning reference signal;

the positioning reference signal is obtained by the positioning vehicle according to the configuration information of the positioning reference signal.

For the embodiments of the present application, the configuration information of the positioning reference signal is determined by a positioning vehicle, and the transmission of the positioning reference signal is started to a vehicle to be positioned according to the configuration information, and the vehicle to be positioned can determine the positioning measurement quantity according to the positioning reference signal, and improving the positioning performance and avoiding configuration conflicts between positioning reference signals.

BRIEF DESCRIPTION OF THE DRAWINGS

In order to more clearly illustrate the embodiments of the present application, the drawings used in the descriptions of the embodiments will be briefly described below. The drawings in the following description are only some embodiments of the present application, and other drawings can be obtained.

DETAILED DESCRIPTION

The embodiments of the present application are further described in detail below with reference to the drawings The following embodiments are only used to more clearly illustrate the embodiments of the present application, and cannot be used to limit the protection scope of the present application.

Figure 1:
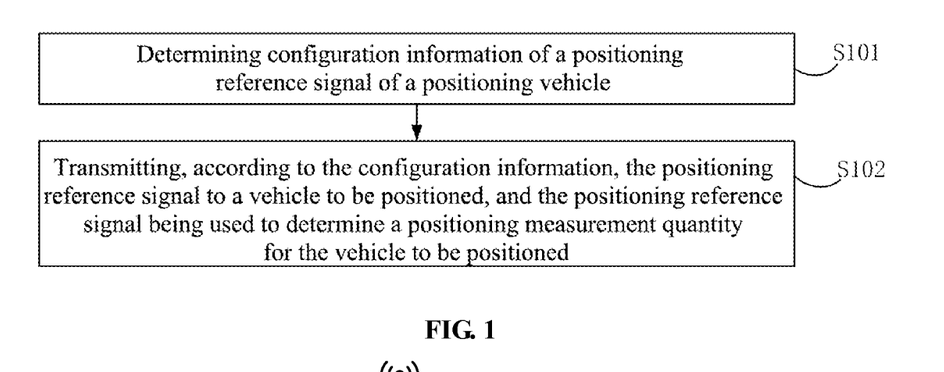
FIG. 1 is a schematic flowchart of a vehicle positioning method at a positioning vehicle side according to an embodiment of the present application.

FIG. 1 shows a schematic flowchart of a vehicle positioning method at a positioning vehicle side according to an embodiment of the present application. The method includes:

S101, determining configuration information of a positioning reference signal of a positioning vehicle.

The positioning vehicle is a vehicle that transmits the positioning reference signal.

The positioning reference signal is a reference signal for positioning.

The configuration information is information for configuring the positioning reference signal.

In particular, the positioning vehicle determines configuration information of the positioning reference signal of a host vehicle according to a received configuration signaling or resources and information preconfigured by a system.

S102, transmitting, according to the configuration information, the positioning reference signal to a vehicle to be positioned, and determining, by the vehicle to be positioned, a positioning measurement quantity according to the positioning reference signal.

The vehicle to be positioned is a vehicle that needs to be positioned.

The positioning measurement quantity is a physical quantity used for positioning measurement.

In particular, in order to position the vehicle to be positioned, respective positioning reference signals of at least one positioning vehicle are transmitted to the vehicle to be positioned, respectively, and the vehicle to be positioned determines its own positioning measurement quantity according to the respective positioning reference signals and is finally positioned according to the positioning measurement quantity.

In an embodiment of the present application, the configuration information of the positioning reference signal is determined by a positioning vehicle, and the transmission of the positioning reference signal is started to a vehicle to be positioned according to the configuration information, and the vehicle to be positioned can determine the positioning measurement quantity according to the positioning reference signal, and improving the positioning performance and avoiding configuration conflicts between positioning reference signals.

Further, on the basis of the above method embodiments, determining the configuration information of the positioning reference signal of the positioning vehicle may include:

receiving a configuration signaling of the positioning reference signal transmitted by a head vehicle, and determining configuration information of a positioning reference signal of a positioning vehicle according to the configuration signaling; or determining configuration information of a positioning reference signal of a positioning vehicle according to positioning reference signal resources and/or the vehicle-specific information preconfigured by a system.

The head vehicle is a leading vehicle among all positioning vehicles, and the positioning reference signal is separately configured for each positioning vehicle through the configuration signaling of the positioning reference signal.

The positioning reference signal resources include a time division multiplexing resource or a frequency division multiplexing resource.

The vehicle-specific information is unique identification information of each vehicle, including an ID of a vehicle or vehicle cyclic redundancy check (CRC) code.

It should be noted that the head vehicle may be a vehicle to be positioned (as in Embodiment 1), or may be any other vehicles (as in Embodiment 2).

Embodiment 1

Figure 2:
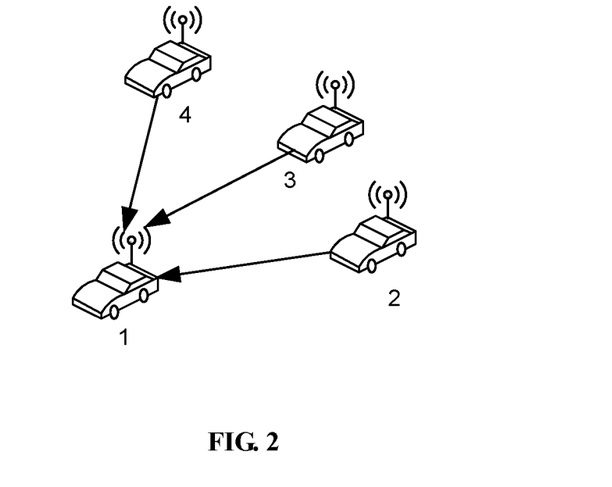
FIG. 2 is a schematic diagram of a vehicle positioning scenario according to an embodiment of the present application.

In a vehicle positioning scenario shown in FIG. 2, a vehicle 1 to be positioned (the head vehicle) performs positioning based on positioning reference signals transmitted by a positioning vehicle 2, a positioning vehicle 3, and a positioning vehicle 4. The head vehicle configures positioning reference signals for the positioning vehicle 2, the positioning vehicle 3, and the positioning vehicle 4, respectively through a configuration signaling of the positioning reference signal. In the present embodiment, a possible configuration signaling of the positioning reference signal is shown in Table 1 below:

TABLE 1

| Configuration signaling of the positioning reference signal | |
|---|---|
| vehicle 2 | positioning reference signal resource 1 |
| vehicle 3 | positioning reference signal resource 2 |
| vehicle 4 | positioning reference signal resource 3 |

The time division multiplexing or frequency division multiplexing is used among the positioning reference signal resources 1, 2 and 3. For example, a time division multiplexing method includes that the positioning reference signal resource 1 is transmitted in a subframe n+1, the positioning reference signal resource 2 is transmitted in a subframe n+2, and the positioning reference signal resource 3 is transmitted in a subframe n+3. The time-frequency resources occupied by the positioning reference signal resources 1 to 3 are pre-defined and known by the vehicles 1 to 4 in advance, and indexes for indicating positioning reference signal resources are only needed in the configuration signaling of the positioning reference signal.

The time-frequency resources occupied by the positioning reference signal resources 1 to 3 may also be indicated to the positioning vehicles 2 to 4 by the above configuration signaling of the positioning reference signal. The configuration signaling of the positioning reference signal is shown in Table 2 below:

TABLE 2

| Configuration signaling of the positioning reference signal | |
|---|---|
| vehicle 2 | positioning reference signal resource 1 including a time-frequency resource indication of the positioning reference signal |
| vehicle 3 | positioning reference signal resource 2 including a time-frequency resource indication of the positioning reference signal |
| vehicle 4 | positioning reference signal resource 3 including a time-frequency resource indication of the positioning reference signal |

The above configuration signaling of the positioning reference signal may be transmitted by a physical side link control channel (PSCCH). Since the vehicle 1 is the head vehicle, it knows configurations of the positioning reference signals for the positioning vehicles 2 to 4. If the vehicle 1 transmits an activation signaling for the positioning reference signal, the positioning vehicles 2 to 4 receive the activation signaling, and transmits the positioning reference signals at the time indicated by the signaling. The vehicle 1 to be positioned may receive the positioning reference signals transmitted by the positioning vehicles 2 to 4 at the time indicated by the signaling. The vehicle 1 measures the time of arrival (TOA), and obtains relative position information of the vehicle 1 according to the measurement result of the TOA.

Embodiment 2

Figure 3:
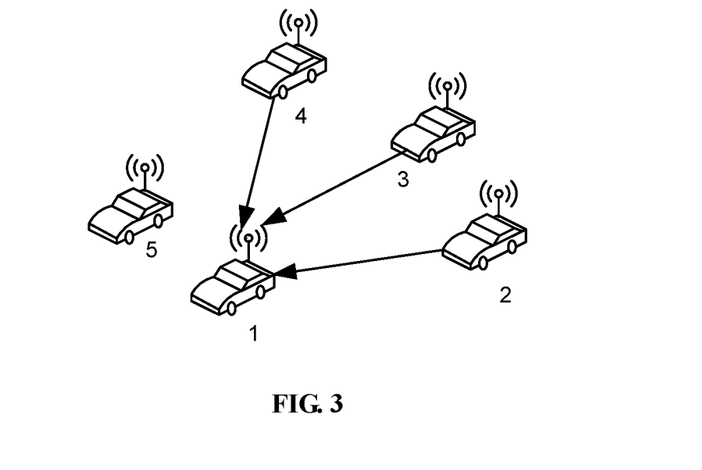
FIG. 3 is a schematic diagram of a vehicle positioning scenario according to another embodiment of the present application.

In a vehicle positioning scenario shown in FIG. 3, a vehicle 1 to be positioned (not the head vehicle) performs positioning based on positioning reference signals transmitted by a positioning vehicle 2, a positioning vehicle 3, and a positioning vehicle 4. The positioning reference signals transmitted by positioning vehicle 2, positioning vehicle 3 and positioning vehicle 4 are configured by a head vehicle 5, which configures positioning reference signals for positioning vehicle 2, positioning vehicle 3 and positioning vehicle 4 respectively through a configuration signaling of the positioning reference signal. For example, the configuration signaling of the positioning reference signal is shown in Table 3 below:

TABLE 3

| Configuration signaling of the positioning reference signal | |
|---|---|
| vehicle 2 | positioning reference signal resource 1 |
| vehicle 3 | positioning reference signal resource 2 |
| vehicle 4 | positioning reference signal resource 3 |

The above configuration signaling of the positioning reference signal may be transmitted by a physical side link control channel (PSCCH).

The vehicle 1 to be positioned receives the configuration signaling of the positioning reference signal transmitted by the head vehicle 5, and obtains the positioning reference signal configuration of the vehicles 2-4. If the vehicle to be positioned 1 transmits an activation signaling for the positioning reference signal, the positioning vehicles 2 to 4 receive the activation signaling, and transmits the positioning reference signals at the time indicated by the signaling. The vehicle 1 to be positioned may receive the positioning reference signals transmitted by the positioning vehicles 2 to 4 at the time indicated by the signaling. In particular, the head vehicle 5 transmits the activation signaling for positioning reference signals, and the vehicles 1 to 4 receive the activation signaling. The positioning vehicles 2 to 4 transmit the positioning reference signal at the time indicated by the signaling, and the vehicle to be positioned 1 receives the positioning reference signals at the time indicated by the signaling. The vehicle to be positioned 1 measures the time of arrival (TOA), and obtains relative position information of the vehicle to be positioned 1 according to the measurement result of the TOA.

In particular, when there is a head vehicle, the head vehicle coordinates the allocation of positioning reference signal resources of the positioning vehicles; when there is no head vehicle, the vehicle determines the allocation of its positioning reference signal resources according to the pre-defined positioning reference signal resources and the ID of the vehicle, and avoiding configuration conflicts between positioning reference signals and improving the positioning performance.

In an embodiment, the determining configuration information of a positioning reference signal of a positioning vehicle according to positioning reference signal resources and/or the vehicle-specific information preconfigured by a system includes:

calculating preconfigured vehicle-specific information to obtain a calculation result, and determining at least one positioning reference signal resource corresponding to the calculation result as the configuration information of a positioning reference signal of a positioning vehicle.

In particular, the preconfigured ID of the vehicle (shown in embodiment 3) or CRC check code (shown in Embodiment 4) is calculated to obtain the calculation result, and one or more positioning reference signal resources corresponding to the calculation result are used as the configuration information of a positioning reference signal of a positioning vehicle.

Embodiment 3

The system pre-defines N PRS resources, which are represented as PRS0, PRS1, . . . , PRSN−1. The time-frequency resource locations of the N PRS resources are known to all vehicles. The PRS resources used by each vehicle and pre-defined by the system are determined from the ID of the vehicle through calculations. For example, indexes of the PRS resources used by each vehicle and pre-defined by the system are obtained by performing modulo operation on the ID of the vehicle and N. Assuming that an ID of the vehicle i is denoted as ID(i), and its modulo operation performed on ID(i) and N is denoted as mod(ID(i), N). In the scenario shown in FIG. 2, a vehicle 1 to be positioned performs positioning based on positioning reference signals transmitted by a positioning vehicle 2, a positioning vehicle 3, and a positioning vehicle 4. Assuming that N=10, the IDs of vehicles 1-4 are 1, 2, 3, and 4, respectively. In this case, according to the modulo operation, the positioning vehicle 2 uses PRS2, the positioning vehicle 3 uses PRS3, and the positioning vehicle 4 uses PRS4. The vehicle to be positioned 1 transmits a trigger signaling of the positioning reference signal through the PSCCH channel. In this case, after receiving the trigger signaling from the vehicle 1, the positioning vehicles 2 to 4 transmit PRS2, PRS3 and PRS4 respectively. The vehicle to be positioned 1 can traverse and receive PRS0, PRS1, . . . , PRSN−1 at the moment indicated by the signaling, and determines to receive PRS2, PRS3 and PRS4. It is further determined that the positioning vehicles 2 to 4 have transmitted positioning reference signals. The vehicle to be positioned 1 measures the time of arrival (TOA), and obtains relative position information of the vehicle to be positioned 1 according to the measurement result of the TOA.

Embodiment 4 the PRS resources used by each vehicle and pre-defined by the system are determined from the CRC code of the vehicle. For example, PRS sequences of the PRS resources used by each vehicle and pre-defined by the system are generated by initializing the CRC code of the vehicle. In this case, the positioning vehicle 2, the positioning vehicle 3, and the positioning vehicle 4 in Embodiment 3 use different PRS sequences. Similar to Embodiment 3, the trigger signaling for the positioning reference signal transmitted by the vehicle to be positioned 1 through the PSCCH also includes distance-related information or information related to a received power. The distance-related information represents that all vehicles within this distance range transmit PRS reference signals, while vehicles not within this distance range do not transmit PRS reference signals. Similarly, the received signal power information represents that the vehicles transmit PRS reference signals when the received signal power of the PSCCH is greater than or equal to a power value indicated by the information related to the received power, while vehicles do not transmit PRS reference signals when the received signal power of the PSCCH is less than a power value indicated by the information related to the received power. This manner can reduce the probability of collision when different vehicles transmit PRS reference signals.

In an embodiment, the configuration signaling is configured to:

indicate time-frequency resource information of the positioning reference signals used by the vehicles; or indicate indexes of the positioning reference signals used by the vehicles;

and the vehicles include positioning vehicles and/or vehicles to be positioned.

In case that the configuration signaling is configured to indicate indexes of the positioning reference signals used by the vehicles, the time-frequency resource information of the positioning reference signals is predefined by the system or preconfigured by at least one vehicle; and and the at least one vehicle carries all of the time-frequency resource information.

In particular, as shown in embodiment 1, the time-frequency resources occupied by the positioning reference signal resources 1 to 3 are pre-defined and known by the vehicles 1 to 4 in advance, and indexes for indicating positioning reference signal resources are only needed in the configuration signaling of the positioning reference signal.

In an embodiment, on the basis of the above method embodiments, the vehicle positioning method further includes:

receiving a first activation signaling or a first de-activation signaling of the positioning reference signal transmitted by the head vehicle;

the first activation signaling is configured to indicate a timing at which the transmission of the positioning reference signal is started; and the first de-activation signaling is configured to indicate a timing at which the transmission of the positioning reference signal is terminated.

In an embodiment, on the basis of the above method embodiments, the vehicle positioning method further includes:

receiving a second activation signaling or a second de-activation signaling of the positioning reference signal transmitted by the vehicle to be positioned;

the second activation signaling is configured to indicate a timing at which the transmission of the positioning reference signal is started; and the second de-activation signaling is configured to indicate a timing at which the transmission of the positioning reference signal is terminated; and In particular, when the head vehicle is the vehicle to be positioned, the first activation signaling is the same as the second activation signaling, and the first de-activation signaling is the same as the second de-activation signaling.

When the head vehicle is any vehicle, the first activation signaling is different from the second activation signaling, and the first de-activation signaling is different from the second de-activation signaling.

In an embodiment, on the basis of the above method embodiments, the positioning vehicle is determined according to distance-related information or received signal power information;

the distance-related information is transmitted by the vehicle to be positioned or preset by the system; and the received signal power information is transmitted by the vehicle to be positioned or preset by the system.

Embodiment 5

The system can predefine distance-related information or information related to the received signal power. The rest of the embodiment 5 is the same as in embodiment 4.

Figure 4:
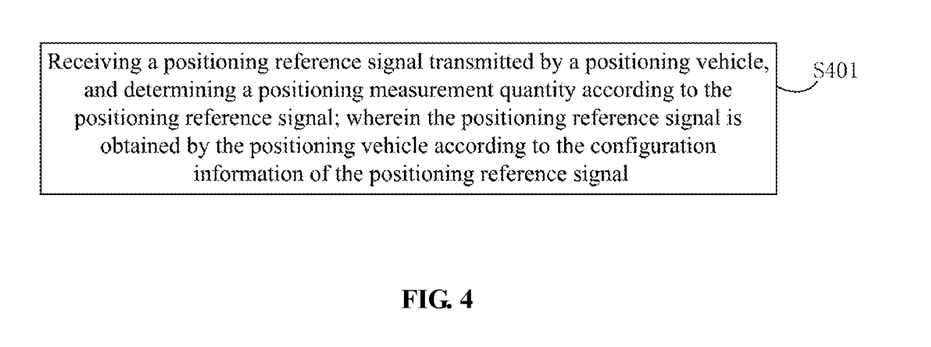
FIG. 4 is a schematic flowchart of a vehicle positioning method at a side of a vehicle to be positioned according to an embodiment of the present application.

FIG. 4 shows a schematic flowchart of a vehicle positioning method at a side of a vehicle to be positioned according to an embodiment of the present application. The method includes:

S401, receiving a positioning reference signal transmitted by a positioning vehicle, and determining a positioning measurement quantity according to the positioning reference signal;

The positioning vehicle is a vehicle that transmits the positioning reference signal.

the positioning reference signal is a reference signal for positioning and obtained by the positioning vehicle according to the configuration information of the positioning reference signal.

The configuration information is information for configuring the positioning reference signal.

In particular, the positioning vehicle determines configuration information of the positioning reference signal of a host vehicle according to a received configuration signaling or resources and information preconfigured by a system.

The positioning measurement quantity is a physical quantity used for positioning measurement.

In an embodiment, in order to position the vehicle to be positioned, respective positioning reference signals of at least one positioning vehicle are transmitted to the vehicle to be positioned, respectively, and the vehicle to be positioned determines its own positioning measurement quantity according to the respective positioning reference signals and is finally positioned according to the positioning measurement quantity.

The vehicle to be positioned is a vehicle that needs to be positioned.

In the embodiments of the present application, the configuration information of the positioning reference signal is determined by a positioning vehicle, and the transmission of the positioning reference signal is started to a vehicle to be positioned according to the configuration information, and the vehicle to be positioned can determine the positioning measurement quantity according to the positioning reference signal, and improving the positioning performance and avoiding configuration conflicts between positioning reference signals.

In an embodiment, on the basis of the above method embodiments, the vehicle positioning method further includes:

transmitting the configuration signaling of the positioning reference signal to the positioning vehicle, and determining, by the positioning vehicle, the configuration information based on the configuration signaling.

In an embodiment, on the basis of the above method embodiments, the configuration information is configured to:

indicate time-frequency resource information of the positioning reference signals used by the vehicles; or indicate indexes of the positioning reference signals used by the vehicles;

and the vehicles include positioning vehicles and/or vehicles to be positioned.

In an embodiment, on the basis of the above method embodiments, in case that the configuration signaling is configured to indicate indexes of the positioning reference signals used by the vehicles, the time-frequency resource information of the positioning reference signals is predefined by the system or preconfigured by at least one vehicle; and the at least one vehicle carries the time-frequency resource information.

In an embodiment, on the basis of the above method embodiments, the vehicle positioning method further includes:

transmitting a first activation signaling or a first de-activation signaling of the positioning reference signal to a positioning vehicle;

the first activation signaling is configured to indicate a timing at which the transmission of the positioning reference signal is started; and the first de-activation signaling is configured to indicate a timing at which the transmission of the positioning reference signal is terminated.

Further, on the basis of the embodiments mentioned above, S401 includes:

receiving the positioning reference signal transmitted by the positioning vehicle in a polling pattern according to positioning reference signal resources preconfigured by the system, and measuring the positioning reference signal to obtain the positioning measurement quantity; or receiving a positioning reference signal transmitted by the positioning vehicle according to indication information transmitted by the positioning vehicle, and determining the positioning measurement quantity according to the positioning reference signal; the indication information is configured to indicate the vehicle-specific information of the positioning vehicle, or configured to indicate the positioning reference signal resource information used by the positioning vehicle.

In an embodiment, on the basis of the above method embodiments, the positioning vehicle is determined according to distance-related information or received signal power information;

the distance-related information is transmitted by the vehicle to be positioned or preset by the system; and the received signal power information is transmitted by the vehicle to be positioned or preset by the system.

The vehicle positioning method on the side of the vehicle to be positioned described in the present embodiment is similar in principle and embodiments to the vehicle positioning method on the side of positioning vehicle side, and can be used to execute the above corresponding method embodiments, which will not be repeated here.

Figure 5:
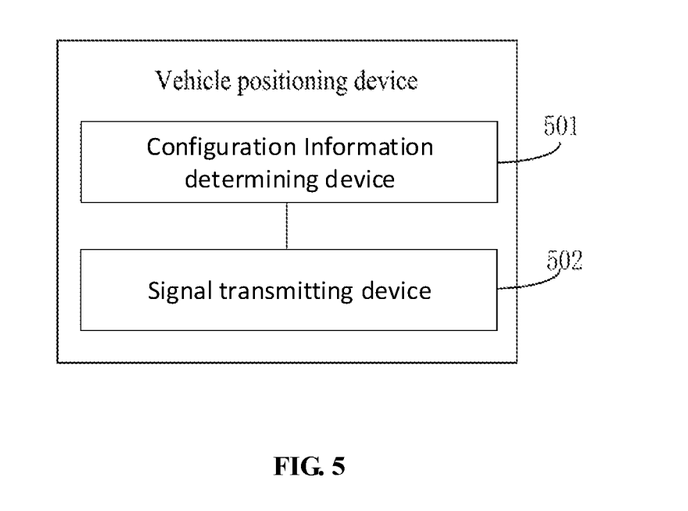
FIG. 5 is a schematic structural diagram of a vehicle positioning device at a positioning vehicle side according to an embodiment of the present application.

FIG. 5 shows a schematic structural diagram of a vehicle positioning device at a positioning vehicle side according to an embodiment of the present application. The vehicle positioning device includes a configuration information determining device 501 and a signal transmitting device 502 in which:

the configuration information determining device 501 configured to determine the configuration information of a positioning reference signal of a positioning vehicle; and a signal transmitting device 502 configured to transmit, according to the configuration information, the positioning reference signal to a vehicle to be positioned, and determining, by the vehicle to be positioned, a positioning measurement quantity according to the positioning reference signal.

In an embodiment, the configuration information determining device 501 is configured to determine the configuration information of a positioning reference signal of a positioning vehicle; and the signal transmitting device 502 configured to transmit, according to the configuration information, the positioning reference signal to a vehicle to be positioned, and determining, by the vehicle to be positioned, a positioning measurement quantity according to the positioning reference signal.

For the embodiments of the present application, the configuration information of the positioning reference signal is determined by a positioning vehicle, and the transmission of the positioning reference signal is started to a vehicle to be positioned according to the configuration information, and the vehicle to be positioned can determine the positioning measurement quantity according to the positioning reference signal, and improving the positioning performance and avoiding configuration conflicts between positioning reference signals.

Figure 6:
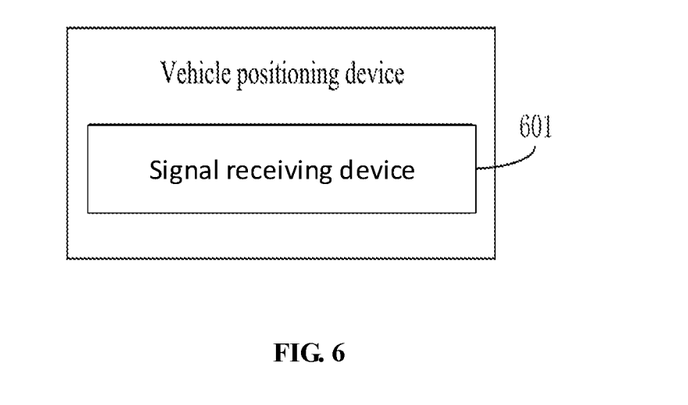
FIG. 6 is a schematic structural diagram of a vehicle positioning device at a side of a vehicle to be positioned according to another embodiment of the present application.

FIG. 6 shows a schematic structural diagram of a vehicle positioning device at a side of a vehicle to be positioned according to an embodiment of the present application. The vehicle positioning device includes a signal receiving device 601 in which:

a signal receiving device 601 configured to receive a positioning reference signal transmitted by a positioning vehicle, and determine a positioning measurement quantity according to the positioning reference signal;

the positioning reference signal is obtained by the positioning vehicle according to the configuration information of the positioning reference signal.

For the embodiments of the present application, the configuration information of the positioning reference signal is determined by a positioning vehicle, and the transmission of the positioning reference signal is started to a vehicle to be positioned according to the configuration information, and the vehicle to be positioned can determine the positioning measurement quantity according to the positioning reference signal, and improving the positioning performance and avoiding configuration conflicts between positioning reference signals.

Figure 7:
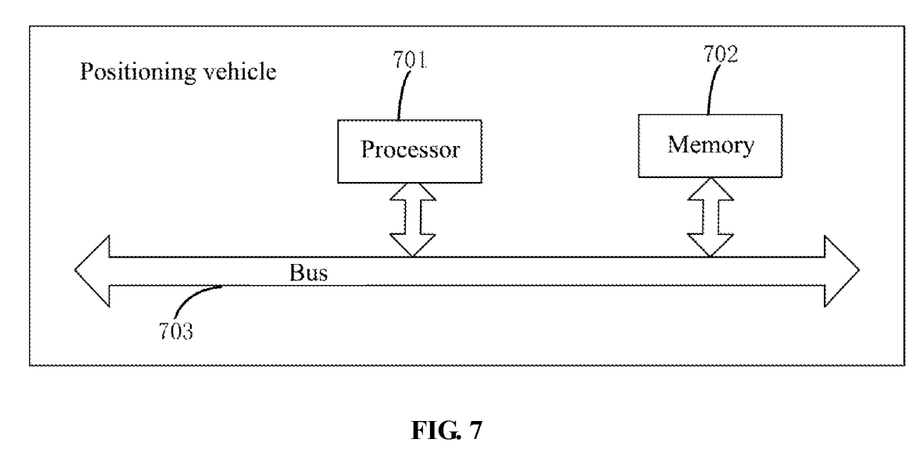
FIG. 7 is a logical block diagram of a positioning vehicle according to an embodiment of the present application.

Referring to FIG. 7, the positioning vehicle includes a processor 701, a memory 902, a communications interface 702 and a bus 703.

In an embodiment, the processor 701 and the memory 702 communicate with each other through the bus 703;

the processor 701 is configured to invoke program instructions in the memory 702 to perform the following steps of:

determining configuration information of a positioning reference signal of a positioning vehicle; and transmitting, according to the configuration information, the positioning reference signal to a vehicle to be positioned, and determining, by the vehicle to be positioned, a positioning measurement quantity according to the positioning reference signal.

For the embodiments of the present application, the configuration information of the positioning reference signal is determined by a positioning vehicle, and the transmission of the positioning reference signal is started to a vehicle to be positioned according to the configuration information, and the vehicle to be positioned can determine the positioning measurement quantity according to the positioning reference signal, and improving the positioning performance and avoiding configuration conflicts between positioning reference signals.

Further, on the basis of the above embodiments, the determining configuration information of a positioning reference signal of a positioning vehicle may include:

receiving a configuration signaling of the positioning reference signal transmitted by a head vehicle, and determining configuration information of a positioning reference signal of a positioning vehicle according to the configuration signaling; or determining configuration information of a positioning reference signal of a positioning vehicle according to positioning reference signal resources and/or the vehicle-specific information preconfigured by a system.

In an embodiment, on the basis of the above embodiments, determining the configuration information of a positioning reference signal of a positioning vehicle according to positioning reference signal resources and/or the vehicle-specific information preconfigured by a system includes:

calculating preconfigured vehicle-specific information to obtain a calculation result, and determining at least one positioning reference signal resource corresponding to the calculation result as the configuration information of a positioning reference signal of a positioning vehicle.

In an embodiment, on the basis of the above embodiments, the configuration information is configured to:

indicate time-frequency resource information of the positioning reference signals used by the vehicles; or indicate indexes of the positioning reference signals used by the vehicles;

and the vehicles include positioning vehicles and/or vehicles to be positioned.

In an embodiment, on the basis of the method embodiments, in case that the configuration signaling is configured to indicate indexes of the positioning reference signals used by the vehicles, the time-frequency resource information of the positioning reference signals is predefined by the system or preconfigured by at least one vehicle; and the at least one vehicle carries the time-frequency resource information.

In an embodiment, on the basis of the above embodiments, the processor also performs the following steps when executing the programs:

receiving a first activation signaling or a first de-activation signaling of the positioning reference signal transmitted by the head vehicle;

the first activation signaling is configured to indicate a timing at which the transmission of the positioning reference signal is started; and the first de-activation signaling is configured to indicate a timing at which the transmission of the positioning reference signal is terminated.

In an embodiment, on the basis of the above embodiments, the head vehicle is the vehicle to be positioned.

In an embodiment, on the basis of the above embodiments, the vehicle-specific information includes an ID of a vehicle or a cyclic redundancy check (CRC) code of the vehicle.

In an embodiment, on the basis of the above embodiments, the vehicle positioning method further includes:

receiving a second activation signaling or a second de-activation signaling of the positioning reference signal transmitted by the vehicle to be positioned;

the second activation signaling is configured to indicate a timing at which the transmission of the positioning reference signal is started; and the second de-activation signaling is configured to indicate a timing at which the transmission of the positioning reference signal is terminated; and In an embodiment, on the basis of the above embodiments, the positioning vehicle is determined according to distance-related information or received signal power information;

the distance-related information is transmitted by the vehicle to be positioned or preset by the system; and the received signal power information is transmitted by the vehicle to be positioned or preset by the system.

The positioning vehicle described in the present embodiment can be used to execute the corresponding method embodiments above, and the principles and embodiments thereof are similar, and details are not described herein again.

Figure 8:
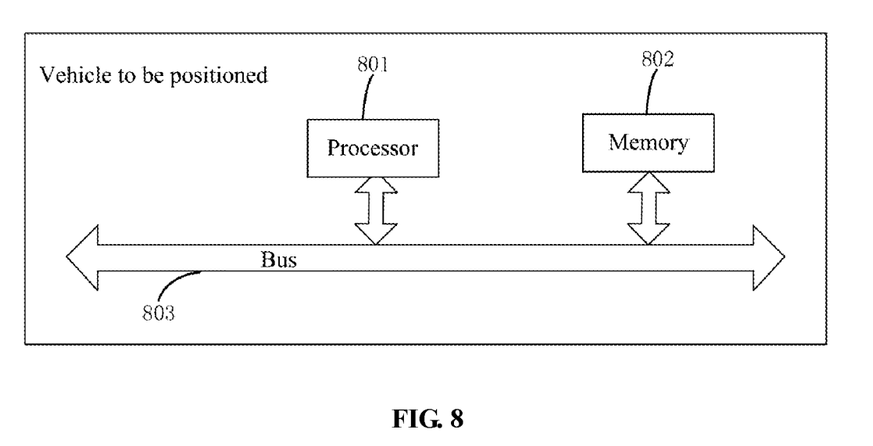
FIG. 8 is a logical block diagram of a positioning vehicle according to another embodiment of the present application.

Referring to FIG. 8, the positioning vehicle includes a processor 801, a memory 902, a communications interface 802 and a bus 803.

In an embodiment, the processor 801 and the memory 802 communicate with each other through the bus 803;

the processor 801 is configured to invoke program instructions in the memory 802 to perform the following step of:

receiving a positioning reference signal transmitted by a positioning vehicle, and determining a positioning measurement quantity according to the positioning reference signal;

the positioning reference signal is obtained by the positioning vehicle according to the configuration information of the positioning reference signal.

In an embodiment, on the basis of the above embodiments, the processor also performs the following steps when executing the programs:

transmitting the configuration signaling of the positioning reference signal to the positioning vehicle, and determining, by the positioning vehicle, the configuration information based on the configuration signaling.

In an embodiment, on the basis of the above embodiments, the configuration information is configured to:

indicate time-frequency resource information of the positioning reference signals used by the vehicles; or indicate indexes of the positioning reference signals used by the vehicles;

and the vehicles include positioning vehicles and/or vehicles to be positioned.

In an embodiment, on the basis of the method embodiments, in case that the configuration signaling is configured to indicate indexes of the positioning reference signals used by the vehicles, the time-frequency resource information of the positioning reference signals is predefined by the system or preconfigured by at least one vehicle; and the at least one vehicle carries the time-frequency resource information.

In an embodiment, on the basis of the above embodiments, the processor also performs the following steps when executing the programs:

transmitting a first activation signaling or a first de-activation signaling of the positioning reference signal to a positioning vehicle;

the first activation signaling is configured to indicate a timing at which the transmission of the positioning reference signal is started; and the first de-activation signaling is configured to indicate a timing at which the transmission of the positioning reference signal is terminated.

In an embodiment, on the basis of the above embodiments, the receiving a positioning reference signal transmitted by a positioning vehicle, and determining a positioning measurement quantity according to the positioning reference signal includes:

receiving the positioning reference signal transmitted by the positioning vehicle in a polling pattern according to positioning reference signal resources preconfigured by the system, and measuring the positioning reference signal to obtain the positioning measurement quantity; or receiving a positioning reference signal transmitted by the positioning vehicle according to indication information transmitted by the positioning vehicle, and determining the positioning measurement quantity according to the positioning reference signal; the indication information is configured to indicate the vehicle-specific information of the positioning vehicle, or configured to indicate the positioning reference signal resource information used by the positioning vehicle.

In an embodiment, on the basis of the above embodiments, the positioning vehicle is determined according to distance-related information or received signal power information;

the distance-related information is transmitted by the vehicle to be positioned or preset by the system; and the received signal power information is transmitted by the vehicle to be positioned or preset by the system.

The vehicle to be positioned described in the present embodiment can be used to execute the corresponding method embodiments above, and the principles and embodiments thereof are similar, and details are not described herein again.

An embodiment discloses a computer program product including: a computer program stored on a non-transitory computer readable storage medium, the computer program includes program instructions which, when executed by a computer, causes the computer to perform the following steps of:

determining configuration information of a positioning reference signal of a positioning vehicle; and transmitting, according to the configuration information, the positioning reference signal to a vehicle to be positioned, and determining, by the vehicle to be positioned, a positioning measurement quantity according to the positioning reference signal.

An embodiment further discloses a computer program product, including: a computer program stored on a non-transitory computer readable storage medium, the computer program includes program instructions which, when executed by a computer, causes the computer to perform the following step of:

receiving a positioning reference signal transmitted by a positioning vehicle, and determining a positioning measurement quantity according to the positioning reference signal;

the positioning reference signal is obtained by the positioning vehicle according to the configuration information of the positioning reference signal.

An embodiment provides a non-transitory computer readable storage medium having stored thereon computer instructions, the computer instructions cause a computer to perform the following steps of:

determining configuration information of a positioning reference signal of a positioning vehicle; and transmitting, according to the configuration information, the positioning reference signal to a vehicle to be positioned, and determining, by the vehicle to be positioned, a positioning measurement quantity according to the positioning reference signal.

An embodiment of the present application further provides a non-transitory computer readable storage medium having computer instructions stored thereon, the computer instructions cause the computer to perform the following step of:

receiving a positioning reference signal transmitted by a positioning vehicle, and determining a positioning measurement quantity according to the positioning reference signal;

the positioning reference signal is obtained by the positioning vehicle according to the configuration information of the positioning reference signal.

The device embodiments described above are merely illustrative, and the units described as separate components may or may not be physically separate, and the components displayed as units may or may not be physical units, that is, may be located at the same place, or it can be distributed to multiple network units. Some or all of the modules may be selected according to actual needs to achieve the purpose of the solution of the present embodiment.

Through the description of the embodiments above, it can be understood that the various embodiments can be implemented by means of software and a necessary general hardware platform, and of course, by hardware. Therefore, the embodiments of the present application provide a software product, which is stored in a storage medium such as ROM/RAM, magnetic Discs, optical discs, etc., including several instructions to cause a computer device (for example, a personal computer, server, or network device, etc.) to perform various embodiments or a part of the methods described in various embodiments.

Finally, it should be noted that the above embodiments are only used to explain the embodiments of the present application, and are not limited thereto; although the present application has been described in detail with reference to the foregoing embodiments, it should be understood that they can still modify the embodiments documented in the foregoing embodiments and make equivalent substitutions to a part of the features; these modifications and substitutions do not make the essence of the corresponding solutions depart from the spirit and scope of the solutions of various embodiments of the present application.

What is claimed is:

1. A vehicle positioning method, performed by a positioning vehicle, comprising:
   determining configuration information of a positioning reference signal of the positioning vehicle; and
   transmitting, according to the configuration information, the positioning reference signal to a vehicle to be positioned, and the positioning reference signal being used to determine a positioning measurement quantity;
   wherein the determining the configuration information of the positioning reference signal of the positioning vehicle comprises: receiving a configuration signaling of the positioning reference signal transmitted by a head vehicle, and determining the configuration information of the positioning reference signal of the positioning vehicle according to the configuration signaling; or determining the configuration information of the positioning reference signal of the positioning vehicle according to positioning reference signal resources and/or vehicle-specific information preconfigured by a system;
   wherein the configuration signaling is configured to: indicate time-frequency resource information of positioning reference signals used by vehicles; or indicate indexes of positioning reference signals used by vehicles; wherein the vehicles comprise positioning vehicles and/or vehicles to be positioned.

2. The vehicle positioning method of claim 1, wherein the determining the configuration information of the positioning reference signal of the positioning vehicle according to positioning reference signal resources and/or the vehicle-specific information preconfigured by the system comprises:
   calculating preconfigured vehicle-specific information to obtain a calculation result, and
   determining at least one positioning reference signal resource corresponding to the calculation result as the configuration information of the positioning reference signal of the positioning vehicle.

3. The vehicle positioning method of claim 1, wherein in case that the configuration signaling is configured to indicate the indexes of the positioning reference signals used by the vehicles, the time-frequency resource information of the positioning reference signals is predefined by the system or preconfigured by at least one vehicle; and
   the at least one vehicle carries the time-frequency resource information.

4. The vehicle positioning method of claim 1, further comprising:
   receiving a first activation signaling or a first de-activation signaling of the positioning reference signal transmitted by the head vehicle;
   wherein the first activation signaling is configured to indicate a timing at which a transmission of the positioning reference signal is started; and
   the first de-activation signaling is configured to indicate a timing at which the transmission of the positioning reference signal is terminated.

5. The vehicle positioning method of claim 1, wherein the head vehicle is the vehicle to be positioned.

6. The vehicle positioning method of claim 1, wherein the vehicle-specific information comprises an ID of a vehicle or a cyclic redundancy check (CRC) code of a vehicle.

7. The vehicle positioning method of claim 1, further comprising:
   receiving a second activation signaling or a second de-activation signaling of the positioning reference signal transmitted by the vehicle to be positioned;
   wherein the second activation signaling is configured to indicate a timing at which a transmission of the positioning reference signal is started; and
   the second de-activation signaling is configured to indicate a timing at which the transmission of the positioning reference signal is terminated.

8. The vehicle positioning method of claim 1, wherein the positioning vehicle is determined according to distance-related information or received signal power information;
   wherein the distance-related information is transmitted by the vehicle to be positioned or preset by the system; and
   the received signal power information is transmitted by the vehicle to be positioned or preset by the system.

9. A vehicle positioning method, performed by a vehicle to be positioned, comprising:
   receiving a positioning reference signal transmitted by a positioning vehicle; and
   determining a positioning measurement quantity according to the positioning reference signal;

wherein the positioning reference signal is obtained by the positioning vehicle according to configuration information of the positioning reference signal;

wherein the configuration information is obtained by the positioning vehicle according to a configuration signaling of the positioning reference signal transmitted by a head vehicle; or the configuration information is obtained by the positioning vehicle according to positioning reference signal resources and/or vehicle-specific information preconfigured by a system;

wherein the configuration signaling is configured to: indicate time-frequency resource information of positioning reference signals used by vehicles; or indicate indexes of positioning reference signals used by vehicles; wherein the vehicles comprise positioning vehicles and/or vehicles to be positioned.

10. The vehicle positioning method of claim 9, further comprising:

transmitting the configuration signaling of the positioning reference signal to the positioning vehicle, and the configuration signaling being used to determine the configuration information.

11. The vehicle positioning method of claim 9, wherein in case that the configuration signaling is configured to indicate the indexes of the positioning reference signals used by the vehicles, the time-frequency resource information of the positioning reference signals is predefined by the system or preconfigured by at least one vehicle; and the at least one vehicle carries the time-frequency resource information.

12. The vehicle positioning method of claim 9, further comprising:

transmitting a first activation signaling or a first de-activation signaling of the positioning reference signal to the positioning vehicle;

wherein the first activation signaling is configured to indicate a timing at which a transmission of the positioning reference signal is started; and the first de-activation signaling is configured to indicate a timing at which the transmission of the positioning reference signal is terminated.

13. The vehicle positioning method of claim 9, wherein receiving the positioning reference signal transmitted by the positioning vehicle, and determining the positioning measurement quantity according to the positioning reference signal comprises:

receiving the positioning reference signal transmitted by the positioning vehicle in a polling pattern according to positioning reference signal resources preconfigured by the system, and measuring the positioning reference signal to obtain the positioning measurement quantity; or receiving the positioning reference signal transmitted by the positioning vehicle according to indication information transmitted by the positioning vehicle, and determining the positioning measurement quantity according to the positioning reference signal; the indication information is configured to indicate vehicle-specific information of the positioning vehicle, or configured to indicate positioning reference signal resource information used by the positioning vehicle.

14. The vehicle positioning method of claim 9, wherein the positioning vehicle is determined according to distance-related information or received signal power information;

wherein the distance-related information is transmitted by the vehicle to be positioned or preset by the system; and the received signal power information is transmitted by the vehicle to be positioned or preset by the system.

15. A positioning vehicle, comprising:

a processor, and a memory storing a computer program that is executable by the processor, wherein the program, in case of being executed by the processor, causes the processor to perform the following steps:

determining configuration information of a positioning reference signal of the positioning vehicle; and transmitting, according to the configuration information, the positioning reference signal to a vehicle to be positioned, wherein the positioning reference signal is used to determine a positioning measurement quantity;

wherein the determining the configuration information of the positioning reference signal of the positioning vehicle comprises: receiving a configuration signaling of the positioning reference signal transmitted by a head vehicle, and determining the configuration information of the positioning reference signal of the positioning vehicle according to the configuration signaling; or determining the configuration information of the positioning reference signal of the positioning vehicle according to positioning reference signal resources and/or vehicle-specific information preconfigured by a system;

wherein the configuration signaling is configured to: indicate time-frequency resource information of positioning reference signals used by vehicles; or indicate indexes of positioning reference signals used by vehicles; wherein the vehicles comprise positioning vehicles and/or vehicles to be positioned.

16. A vehicle to be positioned, comprising:

a processor, and a memory storing a computer program that is executable by the processor, wherein the program, in case of being executed by the processor, causes the processor to perform the method of claim 9.

* * * * *